(12) United States Patent
Roberts

(10) Patent No.: US 7,021,800 B2
(45) Date of Patent: Apr. 4, 2006

(54) BICYCLE LIGHTING SYSTEM

(76) Inventor: Samuel Roberts, 481 N. Igo Way, Tucson, AZ (US) 85710

( * ) Notice: Subject to any disclaimer, the term of this patent is extended or adjusted under 35 U.S.C. 154(b) by 163 days.

(21) Appl. No.: 10/655,080

(22) Filed: Sep. 3, 2003

(65) Prior Publication Data

US 2005/0047155 A1    Mar. 3, 2005

(51) Int. Cl.
*B62J 6/00*    (2006.01)

(52) U.S. Cl. ...................... 362/473; 362/500
(58) Field of Classification Search ................ 362/473, 362/500, 543, 183, 191, 396, 234, 253; 40/587; 359/524, 550

See application file for complete search history.

(56) References Cited

U.S. PATENT DOCUMENTS

| | | | | |
|---|---|---|---|---|
| 5,653,523 A | * | 8/1997 | Roberts | 362/500 |
| 6,501,199 B1 | * | 12/2002 | Hung | 362/473 |
| 6,565,242 B1 | * | 5/2003 | Dai | 362/500 |
| 6,832,847 B1 | * | 12/2004 | Frosythe et al. | 362/473 |

* cited by examiner

*Primary Examiner*—John Anthony Ward
*Assistant Examiner*—Bao Q Truong
(74) *Attorney, Agent, or Firm*—Mark Ogram

(57) ABSTRACT

A lighting system for a vehicle which utilizes a central housing having an electrical power source therein. The central housing is secured to the spokes of a wheel of the vehicle (such as a bicycle) and contains the electrical source. Light emitting units are secured to the spokes of wheel. These light emitting units are powered by the electrical source in said central housing and emit light substantially perpendicular to the plane formed by the wheel. In the preferred embodiment, the central housing uses three different units, one containing a controller and the other two having the power sources. The controller is able to adjust the timing of the lights so that more attention is generated thereby.

20 Claims, 6 Drawing Sheets

BICYCLE LIGHTING SYSTEM

BACKGROUND OF THE INVENTION

This invention relates generally to bicycles and more particularly to lighting systems used by bicycles.

Since the invention of the bicycle in Scotland in 1838 by Kirkpatrick MacMillian, a blacksmith, there has been a never ending list of advancements to the basic structure. These include a steam powered bicycle in 1868, an amphibious bicycle in 1931, the BMX in 1973, and the supine-recumbent in 1993.

The bicycle's development is during the same time as the automobile's own rapid development and acceptance. Unfortunately, the two vehicles do not work well on the same road; but, due to the existing road system, the two vehicles must come in daily contact.

Unfortunately, the bicycle rider is almost "invisible" to an automobile driver who is watching for much larger obstacles. This often results in a collision in which the bicycle rider is always the one who suffers the most.

In an effort to minimize these collisions, there has been a recognition that the more "visible" the bicyclist is, the safer the bicyclist is. To this end, a large number of devices have been developed to assist in enhancing the visibility of the bicyclist. These include: flourescent shirts, blinking lights secured to back-packs, head-lamps and tail lamps, and even flags.

While all of these do assist in creating a more visible bicyclist, there is still a significant need to create an even more increased attention-getting situation.

It is clear there is a need for a light system which is more attention grabbing so as to protect the bicyclist more.

SUMMARY OF THE INVENTION

While the following discussion relates to a bicycle, the invention is not so limited and is intended to include any wheeled vehicle which uses a spoked wheel. This includes: children's tricycles, adults tricycles, motorcycles, automobiles with spoked wheels, and other such vehicles obvious to those of ordinary skill in the art.

The invention creates a lighting system for a vehicle which utilizes a central housing having an electrical power source therein. The electrical source ideally is a series of batteries. In some embodiments of the invention, the batteries are rechargeable from either an external source (fed through a connector to the batteries) or are charged by a generator mounted on the bicycle itself The central housing is secured to the spokes of a wheel of the vehicle and as such is engineered to move with the wheel. In the preferred embodiment, the central housing is secured to the spokes and between the spokes. The central housing is made of two rigid parts. A first part is placed within the spokes and then the other part is "snapped" or otherwise secured to each other.

In this manner, the central housing is secured to the vehicle by a frictional connection with the spokes; thereby eliminating the need for any modification to the vehicle or its wheels. In some embodiments the housing is also secured to the spokes using a compression nut arrangement.

Connected to the central housing and its electrical source are preferably at least two light emitting units which are also secured to the spokes of wheel. Ideally these light emitting units are placed towards the periphery of the wheel (at the end of the spokes) so that maximum movement is perceived.

In the preferred embodiment, electrical current is communicated to the light emitting units through the use of coiled wires which are wrapped around the spoke leading to the light emitting unit. This provides a secure base for the wires so that movement, and hence wear, is minimized.

The light emitting units are secured to the spokes through a variety of techniques. In the preferred embodiment, the housing of the light emitting unit is snapped around the spoke and then secured using a screw-type of clamping mechanism.

These light emitting units are powered by the electrical source from the central housing and emit light substantially perpendicular to the plane formed by the wheel. This is accomplished by the structure of the lenses within the light emitting units which are positioned so that once the unit is snapped onto the spoke, light is emitted substantially perpendicular to the wheel's plane.

Also, in the preferred embodiment, light is transmitted on both sides of the wheel.

In the preferred embodiment, the central housing uses three different units. One unit serves as a "master" and has a controller within it. This controller, in the preferred embodiment, is "programable" by the user using a remote or attached keyboard. Using this input, the controller selectively activates the light emitting units in a selected pattern. A position sensor within the "master" unit communicates the wheel's position to the controller so that the lights are activated as programmed.

As example, the lights might only be activated when they are in one of the four principal axis, thereby generating a "pulsing" affect to catch the attention of other motorists.

Also, by using light generators which can emit selected colors, the controller is able to change the color of the light being emitted based upon the position of the light emitting unit. As example, when the light emitting unit is at its highest point, the color may be red while at the bottom point, the light might turn to green, with the intermediate points being yellow.

Again, this capability provides for a heightened visibility and thus, greater protection for the bicyclist.

With the controller and its attendant sensors within one housing, in the preferred embodiment, the power sources are secured within the other two units. In one embodiment of the invention, the batteries are removable. This allows other devices to be placed within the battery compartment to accommodate "add-on" devices. One such "add-on" device is a pump which is used to re-inflate a wheel after a hole has been patched. Those of ordinary skill in the art recognize other such "add-ons", including but not limited to, additional light sources.

In this manner, the controller is able to adjust the timing of the lights so that more attention is generated.

The invention, together with various embodiments thereof, is described in more detail by the accompanying drawings and the following descriptions thereof.

DRAWINGS IN BRIEF

DRAWINGS IN DETAIL

Figure 1A:
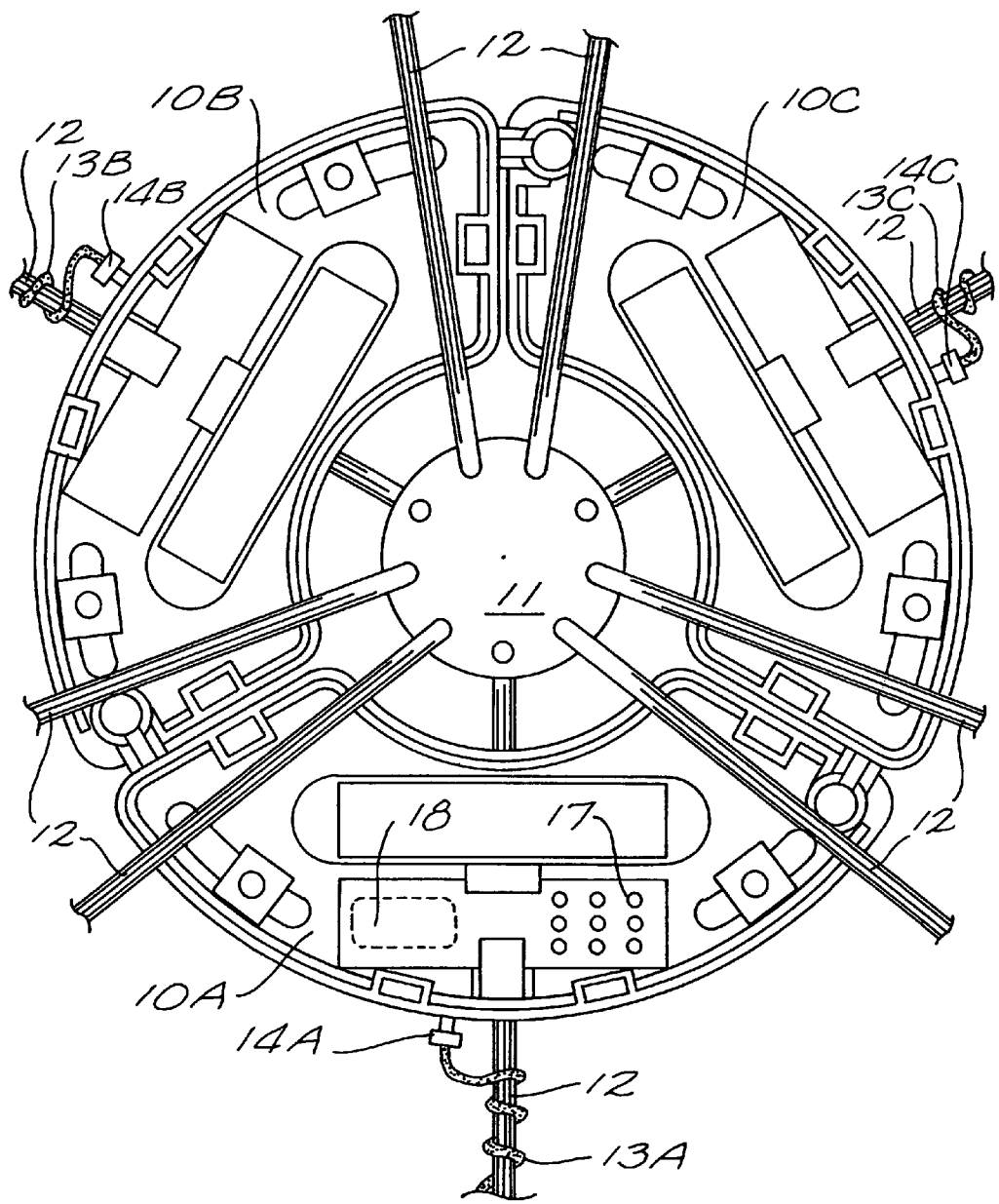
FIGS. 1A and 1B illustrate the preferred embodiment mounted to the spokes of a bicycle wheel.
Figure 1B:
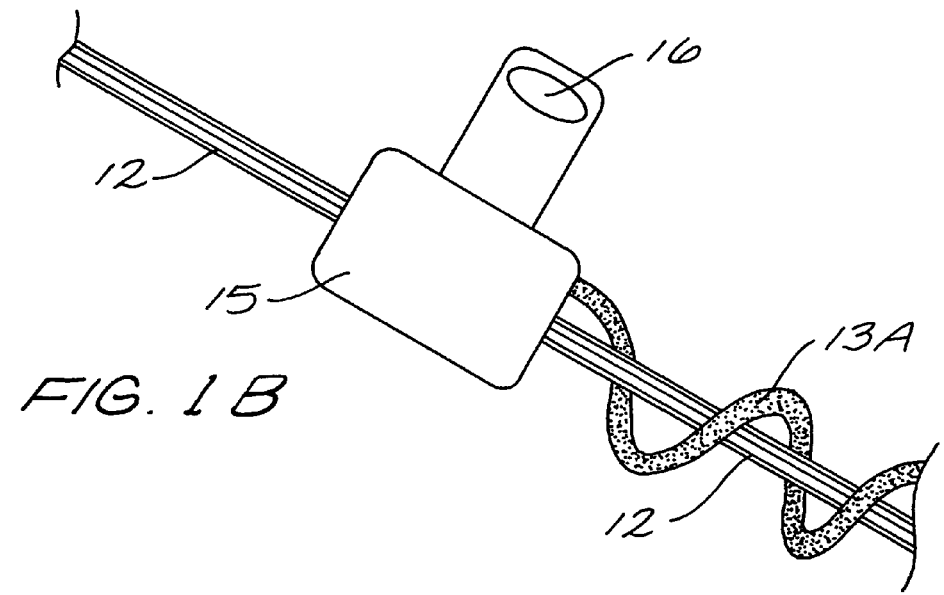

FIGS. 1A and 1B illustrate the preferred embodiment mounted to the spokes of a bicycle wheel.

Referencing FIG. 1A, the traditional bicycle wheel has a central rim 11 with spokes 12 extending outward to the tire (not shown). Interwoven within the spokes are interlocked casings 10A, 10B, and 10C. While this embodiment shows three casings, the invention is not so limited and can include any number of casings, including a single casing.

In this embodiment, casings 12A, 12B, and 12C, form the central housing which contain the control mechanism and the power supply. Each casing 12A, 12B, and 12C are connected to an associated remote light emitting unit (not shown, see FIG. 1B) via wires 13A, 13B, and 13C respectively. Wires 13A, 13B, and 13C are wound around an associated spoke 12 for mechanical attachment and are connected to their related casing via connectors 14A, 14B, and 14C respectively.

Control of the lights is made by processor/controller 18 which contains a position sensor. Commands from the operator via key-pad 17. In this way, processor 18 is able to be activated and its operation is defined by the operator.

In the preferred embodiment, when the position sensor fails to indicate motion for a set period of time (to minutes in the preferred embodiment), controller/processor 18 terminates operation.

A light emitting unit is shown in FIG. 1B. Wire 13A is wound around spoke 12 to light emitting unit 15. Light is emitted from light emitting unit 15 via window 16.

Light emitting unit 15 is secured to the spoke via a locking nut (not shown). In like fashion, casings 10A, 10B, and 10C are also secured to the spokes using a locking nut (also not shown).

Figure 2:
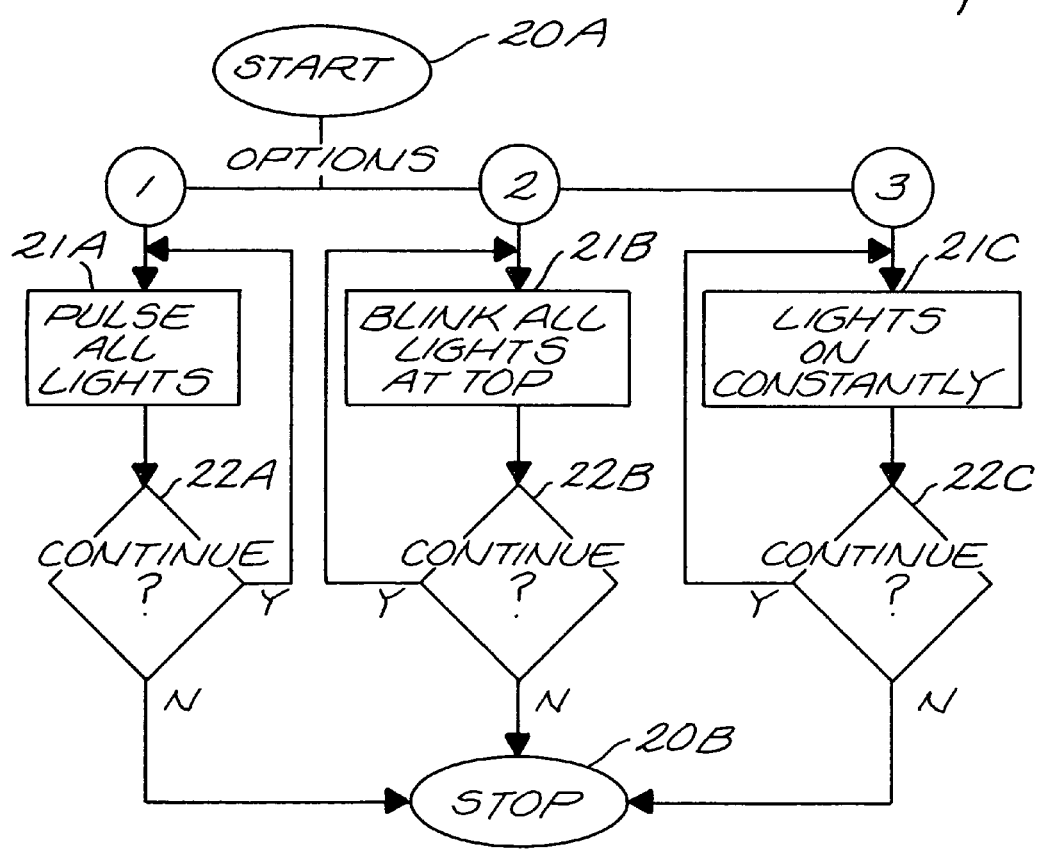
FIG. 2 is a flow-chart of the operation of the process for an embodiment of the invention.

FIG. 2 is a flow-chart of the operation of the process for an embodiment of the invention.

Once the program has started, 20A, the option chosen by the operator is determined. The first option is to pulse all lights 21A. This continues until the operator selects to not continue 22A (or a "time-out" for lack of motion for two minutes) and the program stops 20B.

Another option available on this embodiment is to blink the lights when they are at a "top" position 21B. Again, this continues until the operator indicates that the operation is not to continue or "time out" 22B and the mechanism stops 20B.

In similar fashion, all of the lights are constantly activated 21C (with one embodiment using different color of lights); this continues 22C until the operator decides to discontinue the operation 22C and the program stops 20B.

Since the processor (#18 in FIG. 1A) is equipped with a position sensor, control of the lights is easily accomplished to give the desired visual affect.

Figure 3A:
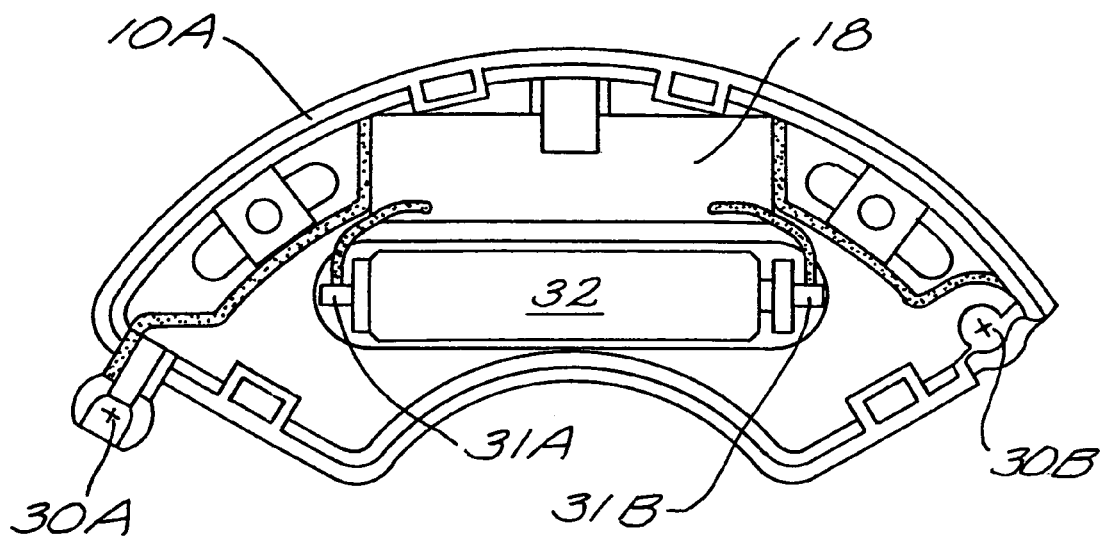
FIGS. 3A and 3B are views of a single compartment of the preferred embodiment's central housing.
Figure 3B:
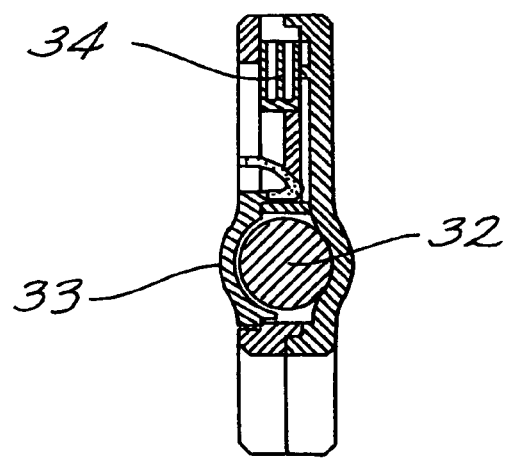

FIGS. 3A and 3B are views of a single compartment of the preferred embodiment's central housing.

These figures illustrate the "master" compartment which contains the processor 18 therein. The two other compartments, as illustrated in FIG. 1A, are "slave" units that provide electricity for the operation and also controlled by the "master". The "slave" units are substantially identical as the "master" except they do not contain a processor.

Unit 10A includes battery 32 which is connected to the electronics via negative contact 31A and positive contact 31B.

This unit is connected, both mechanically and electrically, with its neighbor units via male pivot 30A at one end and female pivot 30B at the other end (connecting with its opposing member of the neighboring compartment). This allows the three units to be "snapped" to each other for both mechanical connection as well as providing electrical connection so that the "slave" units are controlled by the "master" unit.

Battery door 33 permits the battery to be removed and replaced. Further, in some embodiments of the invention, opening or removing battery door 33 permits the battery to be removed and an accessory placed within the compartment. This permits the accessory to receive its electrical energy from the other two units.

Also, in this embodiment, battery 32 is re-chargeable and is recharged via AC jack 34.

Figure 4:
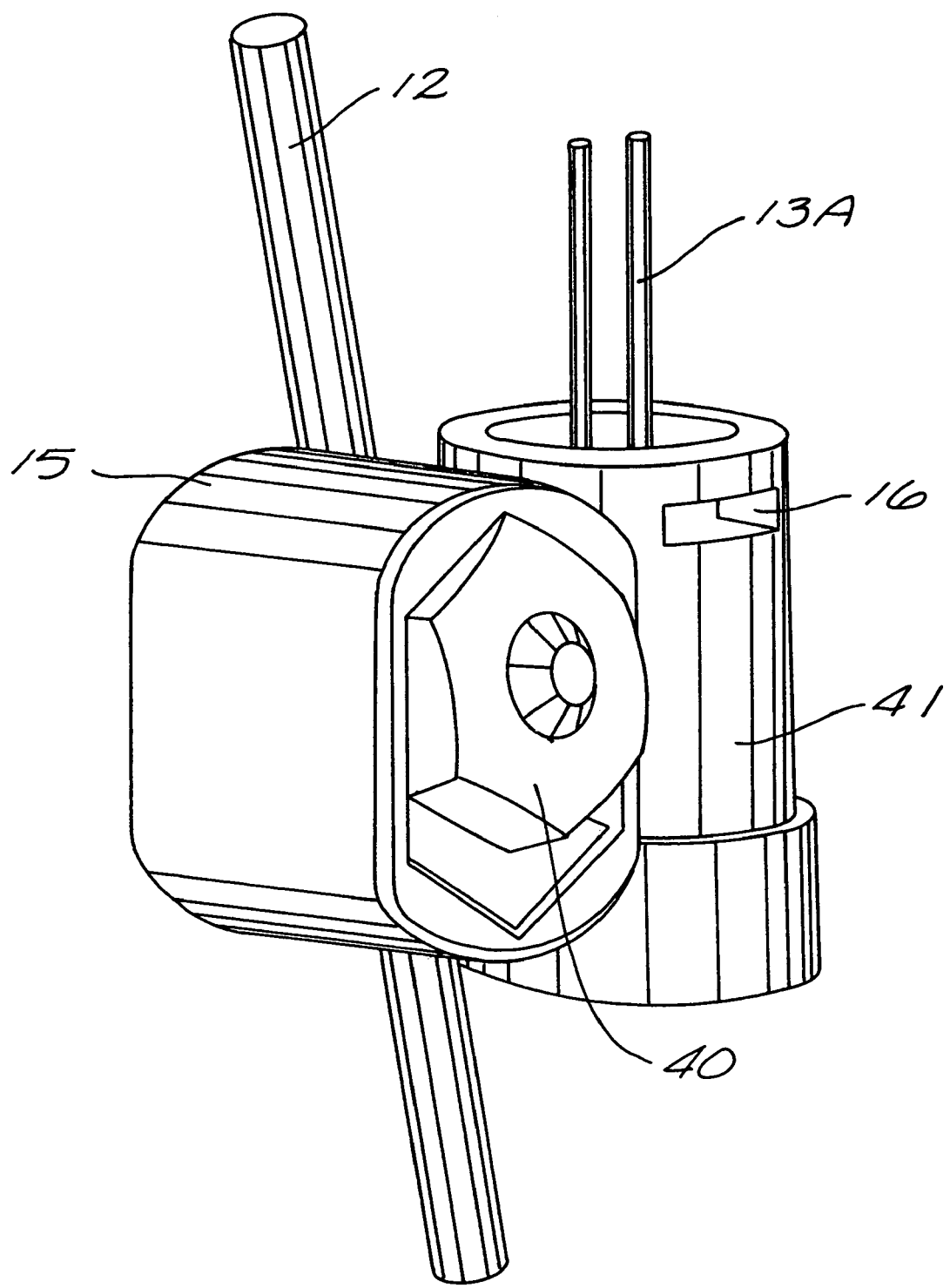
FIG. 4 is a view of the preferred mechanism used to secure the light emitting portion of the invention to the spoke.

FIG. 4 is a view of the preferred mechanism used to secure the light emitting portion of the invention to the spoke.

Light emitting unit 15 is secured to spoke 12 via compression nut 40 which allows the user to place the light at any place along spoke 12 that the user desires. Once placed, light emitting unit 15 is configured so that light exiting from opening 16 is substantially perpendicular to the plane formed by the wheel of the bicycle (not shown).

A similar compression nut is provided on the compartments described above so that they can be mechanically affixed to the spokes.

Electrical energy is provided to the light source contained within housing 41 via electrical wire 13A.

Figure 5:
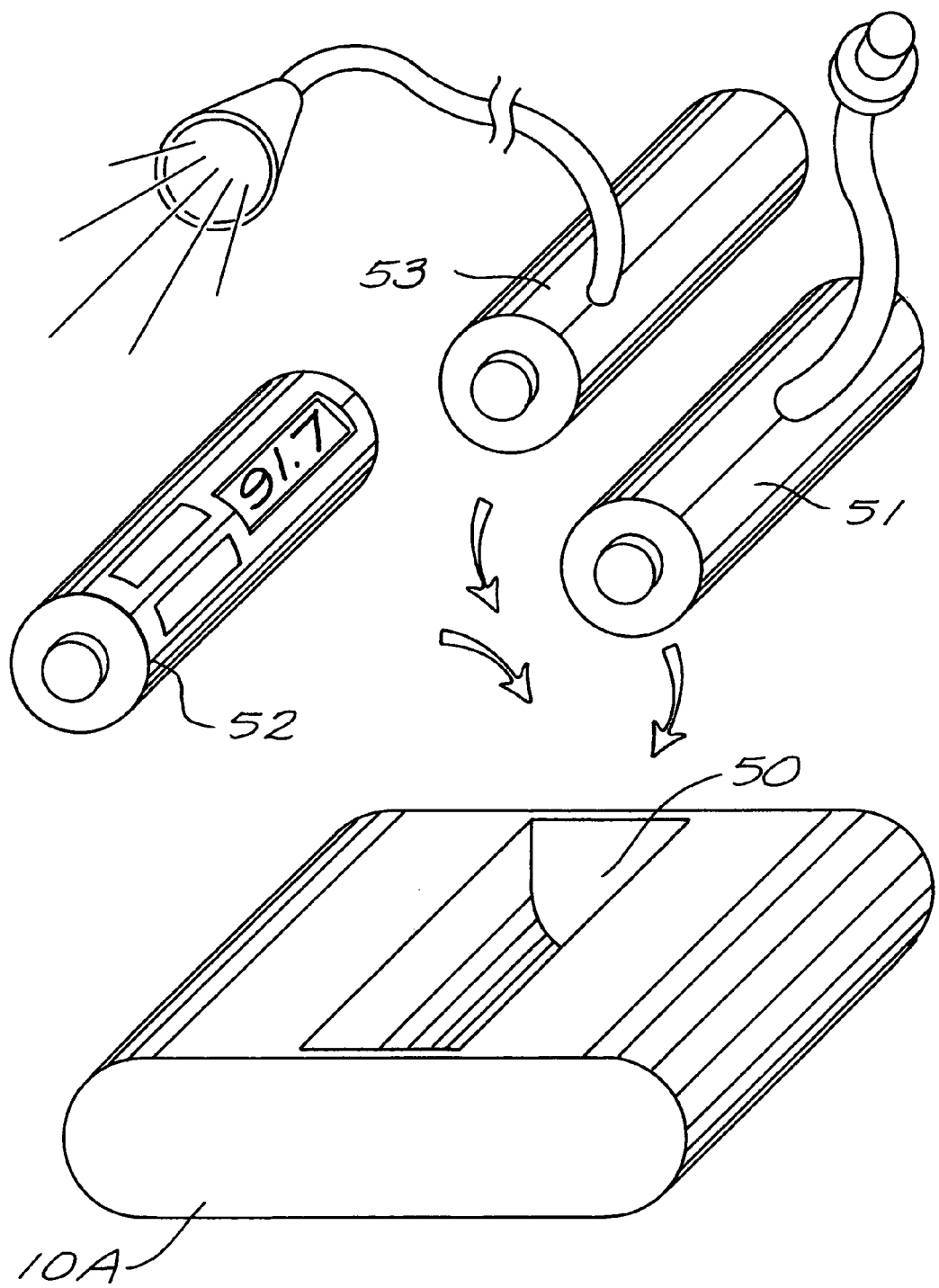
FIG. 5 illustrates the invention's use of "plug-in" apparatus.

FIG. 5 illustrates the invention's use of "plug-in" apparatus.

Unit 10A has its battery removed for illustration purposes. This exposes battery cavity 50, thereby allowing the user to place an accessory apparatus therein. Such accessory apparatus includes tire pump 51, radio 52, or light 53.

In this manner, the electrical energy is drawn from the neighboring units to power the accessory apparatus.

Figure 6:
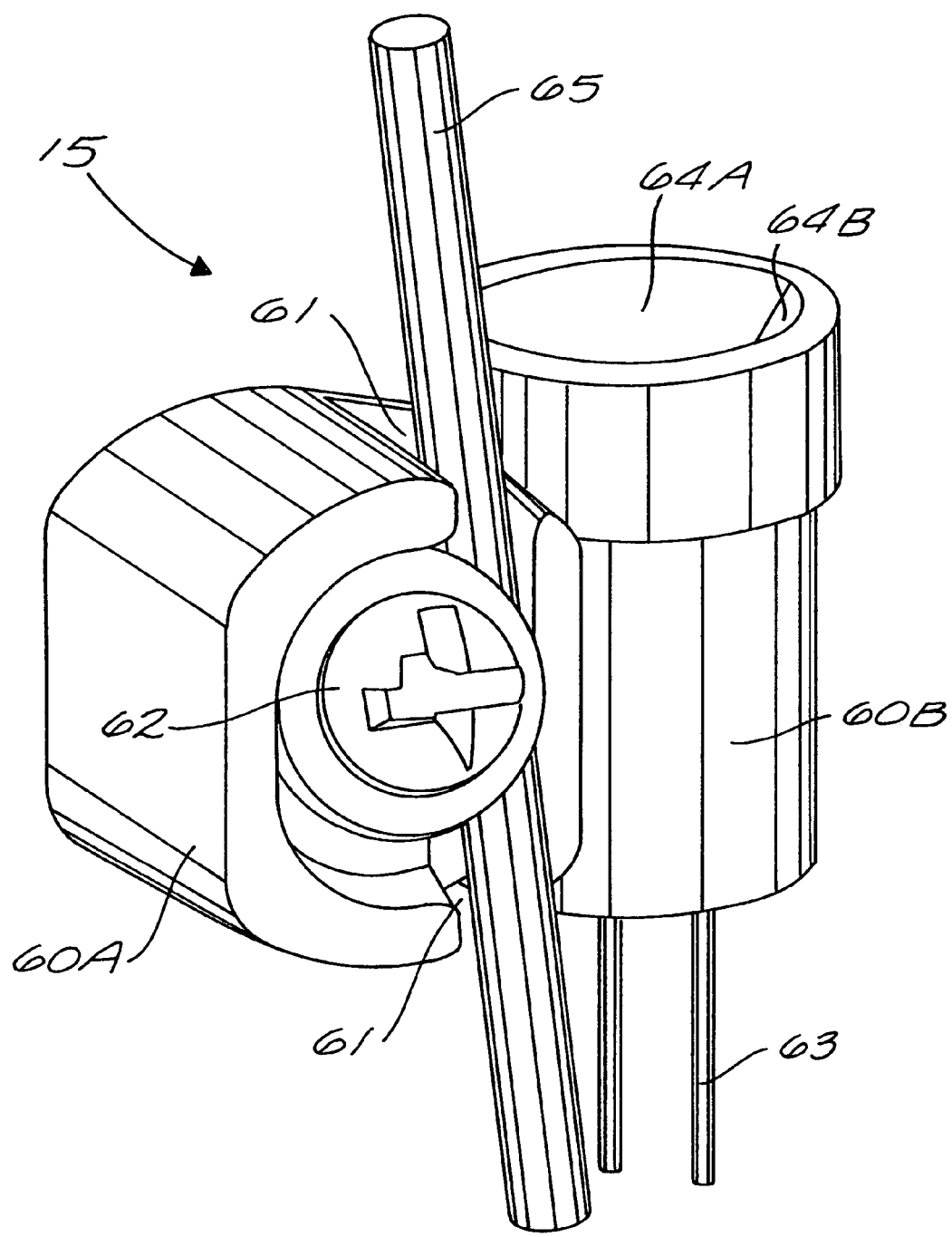
FIG. 6 illustrates the preferred embodiment of the lense mechanism.

FIG. 6 illustrates the preferred lense mechanism for the light emitting units.

Lense mechanism 15 has two main sections: Clasping mechanism 60A, and Light emitting structure 60B.

Clasping mechanism 60A is secured to spoke 65 by channel 61 which curves to maintain frictional contact with spoke 65. Locking nut 62 is tightened against spoke 65 and secures lense mechanism 15 in the proper location on spoke 65. Locking nut 62 has a degree of "wobble", thereby allowing the lense mechanism to be rotated slightly to allow the installer to direct the light from light emitting structure 60B properly (ideally perpendicular with the plane of the wheel).

Light emitting structure 60B is supplied electricity from wire 63 which communicates with the main bodies described above. The light emitting diode or bulb within light emitting structure 60B (not visible) is directed through lense mechanism 64A and 64B. Through the use of two lenses, the light is split into two directions (both sides of the wheel).

It is clear that the present invention provides a bicycle light system which is better able to protect the bicyclist.

What is claimed is:

1. A lighting system for a vehicle comprising:
 a) a central housing having an electrical power source therein, said central housing secured to and supported by spokes of a wheel of the vehicle, wherein said central housing unit includes at least two casings, each of said casings secured to a neighboring casing, and wherein,
  1) a first casing includes a controller having means for selectively communicating light to each of said at least two light emitting units and, 2) a second casing includes at least one electrical battery communicating electrical energy from said at least one electrical battery to the controller of the first casing;
b) at least two light emitting units, each of said light emitting units secured to an individual spoke of the wheel of the vehicle; and,
c) at least two electrically conductive wires, each of said electrically conductive wires communicating electrical current from the electrical power source to one of said at least two light emitting units.

2. The lighting system for a vehicle according to claim 1, wherein said at least two casings is three casings.

3. The lighting system according to claim 1, wherein each of said at least one electrical battery is contained within a housing having a removable battery case lid.

4. The lighting system according to claim 3, further including an accessory apparatus adapted to replace the at least one batteries within said housing.

5. The lighting system according to claim 4 wherein the accessory apparatus includes a light source.

6. The lighting system according to claim 4 wherein the accessory apparatus includes a tire pump.

7. The lighting system for a vehicle according to claim 1,
a) wherein said at least one electrical battery are re-chargeable; and,
b) further including means for receiving, from an external source, electrical energy for the at least one re-chargeable electrical battery.

8. The lighting system for a vehicle according to claim 1,
a) further including an operator input apparatus adapted to receive commands from a user; and,
b) wherein said controller is responsive to signals from said operator input apparatus.

9. The lighting system for a vehicle according to claim 8, further including:
a) positional sensing means communicating a relative position of the wheel to said controller; and,
b) wherein said controller includes means for selectively conducting electrical energy from said batteries to said light emitting units based upon a signal from said positional sensing means.

10. The lighting system for a vehicle according to claim 9, wherein said controller includes means for terminating operation based upon a lapse of signal from said positional sensing means indicating a lack of motion for a pre-determined amount of time.

11. The lighting system for a vehicle according to claim 1, wherein each of the casings includes:
a) a first section; and,
b) a second section securable to said first section such that an envelope is formed between the first section and the second section.

12. A lighting system for a vehicle comprising:
a) a central housing having an electrical power source therein, said central housing secured to and supported by spokes of a wheel of the vehicle;
b) at least two light emitting units, each of said light emitting units secured to an individual spoke of the wheel of the vehicle, and including,
1) a light source, and,
2) a lense mechanism adapted to direct light from said light source substantially perpendicular to a plane formed by the wheel, said lense mechanism having;
A) a snap clip adapted to secure the lense mechanism to a spoke of the wheel,
B) an enclosure enclosing said light source, and,
C) a first and second lense held such that light from said light source passes through said first and second lense along an axis substantially perpendicular to a plane formed by the wheel; and,
c) at least two electrically conductive wires, each of said electrically conductive wires communicating electrical current from the electrical power source to one of said at least two light emitting units.

13. The lighting system for a vehicle according to claim 12, wherein said snap clip includes a nut/screw adapted to maintain compression between the snap and the spoke.

14. A lighting system for a vehicle comprising:
a) a central housing having an electrical power source therein, said central housing secured to and supported by spokes of a wheel of the vehicle, said central housing containing an electrical source and including,
1) a first casino having a controller with means for selectively communicating electricity to each of said at least two light emitting units, and,
2) a second and a third casing each having electrical sources therein; and,
b) at least one light emitting units, each light emitting unit powered by the electrical power source in said central housing and secured to an individual spoke of the wheel of the vehicle.

15. The lighting system for a vehicle according to claim 14,
a) wherein said electrical sources are re-chargeable; and,
b) further including means for recharging said electrical sources.

16. The lighting system for a vehicle according to claim 14,
a) further including an operator input apparatus adapted to receive commands from a user; and,
b) wherein said controller is responsive to signals from said operator input apparatus.

17. The lighting system for a vehicle according to claim 16, further including:
a) positional sensing means communicating a relative position of the wheel to said controller; and,
b) wherein said controller includes means for selectively conducting electrical energy from said electrical source to said light emitting units based upon a signal from said positional sensing means.

18. The lighting system for a vehicle according to claim 17, wherein said light emitting unit includes means for communicating light in at least two colors.

19. The lighting system for a vehicle according to claim 14, wherein each of said light emitting units includes:
a) a light source; and,
b) a lense mechanism adapted to direct light from said light source substantially perpendicular to a plane formed by the wheel.

20. The lighting system for a vehicle according to claim 19, wherein each of said lense mechanisms includes:
a) a snap clip adapted to secure the lense mechanism to a spoke of the wheel;
b) an enclosure enclosing said light source; and,
c) wherein said lense mechanism includes a first and second lense held by said enclosure such that light from said source passes through said first and second lense along an axis substantially perpendicular to a plane formed by the wheel.

* * * * *